Patented Nov. 30, 1937

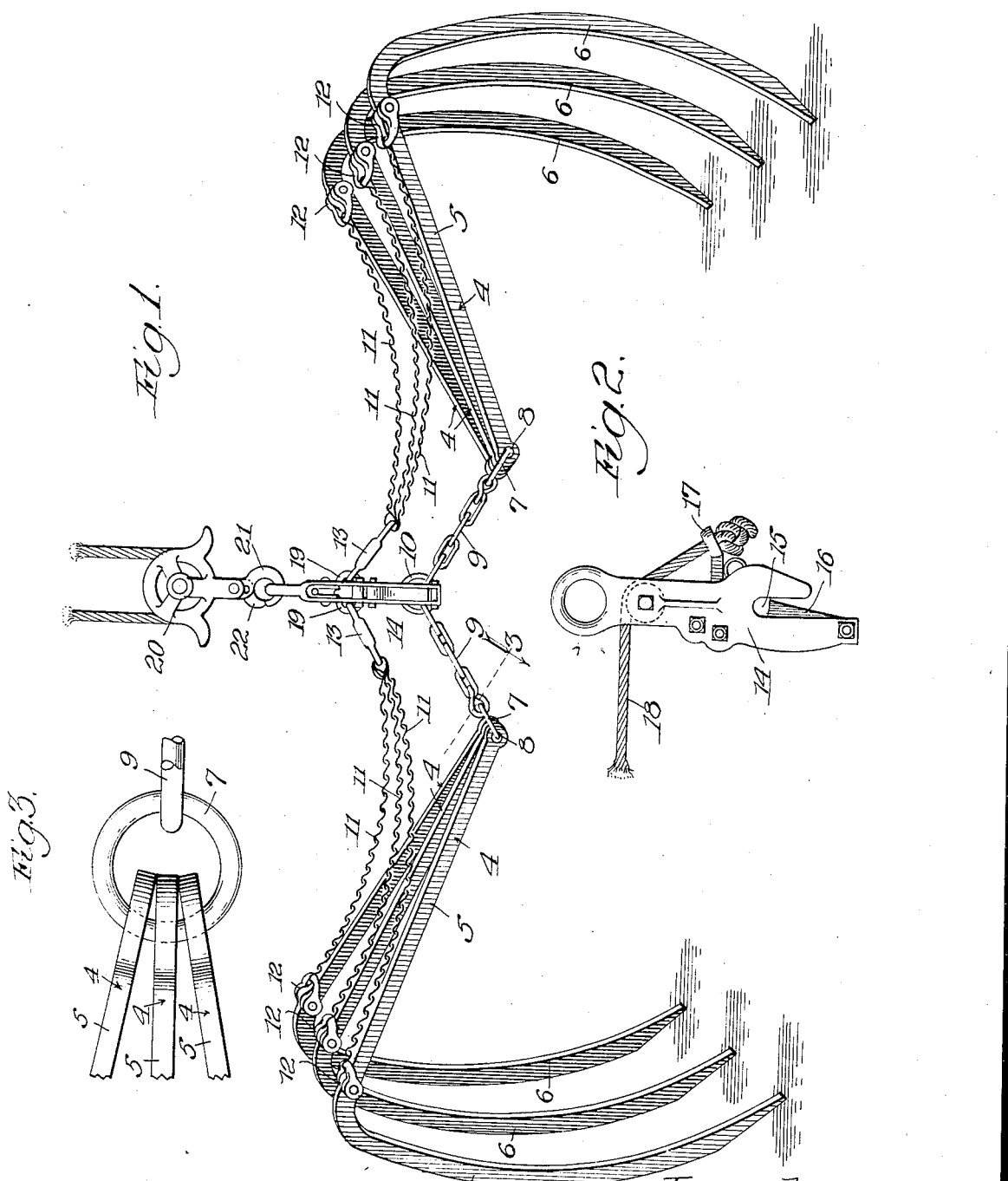

2,100,800

UNITED STATES PATENT OFFICE 2,100,800

GRAPPLE-FORK

Robert G. Ferris, Harvard, Ill., assignor to Starline, Inc., Harvard, Ill., a corporation of Illinois Application April 1, 1936, Serial No. 72,171

7 Claims. (Cl. 294—107)

My invention relates to grapple-forks for use more particularly in shifting hay from one location to another, as for example from a wagon into a loft, or vice versa, and comprising groups of tines adapted to be manipulated toward each other into carrying engagement with the hay to pick up a load thereof, and away from each other to discharge the load.

One of my objects is to provide a construction of grapple-fork whereby the work required of the operator in positioning the fork for taking a load, is greatly lightened; and the fork is better adapted to satisfactorily perform under the various conditions met with in practice.

Another object is to provide a grapple-fork which while greatly minimizing the work required of the operator, will not be subject to the objection of the tines becoming tangled with the suspending means therefor resulting from the dropping of the fork when collapsed upon the hay and the subsequent tauting of the supporting means for the tines; the purpose in this connection being to provide a construction wherein the tines are adapted to be individually manipulated relative to each other with the advantages resulting therefrom, but without the possibility of such tangling of the parts as to interfere with the proper functioning of the device to carry and discharge a load; and other objects as will be manifest from the following description.

Referring to the accompanying drawing:

Figure 1 is a perspective view of a grapple-fork constructed in accordance with my invention, the structure shown being represented in the position from which it is operated to load-engaging position.

Figure 2 is a view in elevation of the lock block forming a part of the apparatus shown in Fig. 1; and Figure 3, a fragmentary plan section, the view being taken at the line 3 on Fig. 1 and viewed in the direction of the arrow.

According to the particular illustrated embodiment of my invention, the fork comprises two groups of tines 4, each group being shown as comprising three of the tines each of which is formed of an upper bar section 5 and a load engaging portion 6 at its outer end and disposed preferably at substantially a right angle thereto. The tines of one group are reversely disposed relative to the tines of the other group as shown in Fig. 1 whereby when the fork is operated, as hereinafter described, to take a load, the load engaging portions 6 of the two groups of tines engage the load from opposite sides thereof and swing toward each other into load carrying position.

The inner ends of the tines 4 of each group are connected together in a manner to permit the tines to be manipulated independently of each other but without becoming so disarranged at their inner, connected, ends as to permit them to become tangled, as they are very apt to do if connected together by a chain or similar element. To accomplish this end the connecting means referred to are in the form of an element which cannot become doubled, or folded, upon itself and prevents the tines from becoming disarranged as above pointed out, maintaining them against tangling; the element according to the preferred illustrated construction comprising a loop or link member 7, shown by way of example as of ring form, relatively rigid as distinguished from the characteristics of a chain as above noted, and on which the tines 4, at their inner ends, are strung, preferably loosely, as shown, the apertures in the tines through which the ring extends being represented at 8.

The construction shown also comprises a chain 9 having a ring 10 midway between its ends, the chain being secured at its end portions to the links or rings 7.

Each group of tines 4 is provided with a bridle-chain shown as formed of three chain sections 11 shown as connected at their outer ends to clevises 12 secured to the respective tines 4, and at their inner ends with a snap-hook 13 of common construction.

The grapple-fork is shown as associated with hoisting and controlling mechanisms as commonly employed with forks of this kind, these mechanisms comprising a lock-block 14 having a recess 15 to receive the ring 10 below which is a pivoted keeper 16 for holding the ring 10 to the block 14, the keeper 16 being urged by a spring (not shown) into locking position and withdrawable therefrom through the medium of a pivoted lever 17 actuated to a position for withdrawing the keeper 16 from locking position by means of a pull-rope 18.

The lock-block 14 is provided at its opposite sides with eyes 19 to interlock with the snap-hooks 13, and is supported from block and tackle mechanism represented at 20 and which in practice may be supported to depend from a carrier (not shown) movable along a track (not shown) as is common in hay-carrier apparatus, the connection between the lock-block 14 and the hoisting mechanism being preferably releasable, as for example by providing the hoisting mechanism with a hook 21 having a pivoted keeper 22.

In the use of the fork it is lowered to the hay to be lifted as for example to a position in which the tines 4 rest on the hay in unsupported condition by the hoisting mechanism; and the operator then, by individually manipulating the tines independently of each other, positions the several tines, by inserting them into the hay and forcing them downwardly, at opposite sides of the portion of the hay which is to comprise the load to be lifted. The hoisting mechanism is then operated to raise the fork, the ring 10 being locked to the lock-block 14. In this position of the parts the lifting force exerted by the hoisting mechanism is exerted on the tines 4 at their connections with the rings 7, whereby the tines are swung inwardly at their portions 6 toward the mass of hay between the latter causing a load of hay to become cradled in the fork, in carrying position. Upon reaching the point at which the load is to be dumped the operator pulls on the cable 18 which withdraws the keeper 16 and releases the chain 9 from the block 14 whereupon the weight of the load is free to exert a spreading action on the tines (the support of the tines having thus become shifted to the connections between the bridle-chains 11 and the tines) and drops from the fork.

As will be readily understood from the foregoing the dropping of the grapple-fork construction upon the hay, even to a thoroughly collapsed position, cannot result in the tines becoming tangled and not assume their proper positions relative to each other upon actuating the hoisting mechanism, in view of the character of the connections, as above described, between the inner ends of the tines of each group, these connections, however, permitting of the obtaining, in this construction, of all of the advantages of the type of grapple-fork in which each tine is capable of individual manipulation independently of the others, but without possibility of tangling and disarrangement as above set forth.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. In a grapple-fork, a plurality of individually separate tines, a plurality of means flexibly connecting together said tines in separate groups, respectively, each comprising a link member having an opening therethrough, said tines having openings at which they are strung as groups on said members in the openings thereof adapting said tines for swinging movement on said members independently of each other.

2. In a grapple-fork, a plurality of individually separate tines, a plurality of means flexibly connecting together said tines in separate groups, respectively, each comprising a substantially rigid link member having an opening therethrough, said tines having openings at which they are strung as groups on said members adapting said tines for swinging movement on said members independently of each other, and flexible means connecting said rigid members together.

3. In a grapple-fork, a plurality of individually separate tines, a plurality of means flexibly connecting together said tines in separate groups, respectively, each comprising a ring member, said tines having openings through which said ring member is threaded adapting said tines for swinging movement on said member independently of each other.

4. In combination, a support, a grapple-fork comprising groups of individually separate tines, means adapting said tines of each group to have bodily rotational movement relative to each other and releasably connecting said tines to said support at their inner spaced apart ends comprising a ring for each group, said tines having openings through which said rings are threaded, adapting said tines for swinging movement on said rings independently of each other, and means adapting said tines to have rotational movement connected to said support and to said tines at points outwardly beyond the connections of said first-named means with said tines for controlling the position of said tines.

5. In combination, a support, a grapple-fork comprising groups of individually separate tines, means adapting said tines to have bodily rotational movement relative to each other, and releasably connecting said tines to said support at their inner spaced apart ends comprising a link member for each of said groups of tines, respectively, having openings therethrough, said tines having openings at which they are strung as groups on said members adapting said tines for swinging movement on said members independently of each other, and means adapting said tines to have rotational movement connected to said support and to said tines at points outwardly beyond the connections of said first-named means with said tines for controlling the position of said tines.

6. In combination, a support, a grapple-fork comprising groups of individually separate tines, means adapting said tines to have bodily rotational movement relative to each other and releasably connecting said tines to said support at their inner spaced apart ends comprising rings for said groups of tines, respectively, said tines having openings at which they are strung on said rings adapting said tines for swinging and lateral movement on said rings independently of each other, and means adapting said tines to have rotational movement connected to said support and to said tines at points outwardly beyond the connections of said first-named means with said tines for controlling the position of said tines.

7. In combination, a support, a grapple-fork comprising groups of individually separate tines, means adapting said tines to have bodily rotational movement relative to each other and releasably connecting said tines to said support at their inner spaced apart ends comprising rings for said groups of tines, respectively, said tines having openings at which they are strung on said rings adapting said tines for swinging and lateral movement on said rings independently of each other, flexible means connecting said rings together, and means adapting said tines to have rotational movement connected to said support and to said tines at points outwardly beyond the connections of said first-named means with said tines for controlling the position of said tines.

ROBERT G. FERRIS.